Dec. 4, 1951　　　　　　E. T. SLIWINSKI　　　　　2,577,282
　　　　　　　　　　　　DRIVE MECHANISM
Filed July 29, 1946　　　　　　　　　　　　3 Sheets-Sheet 1
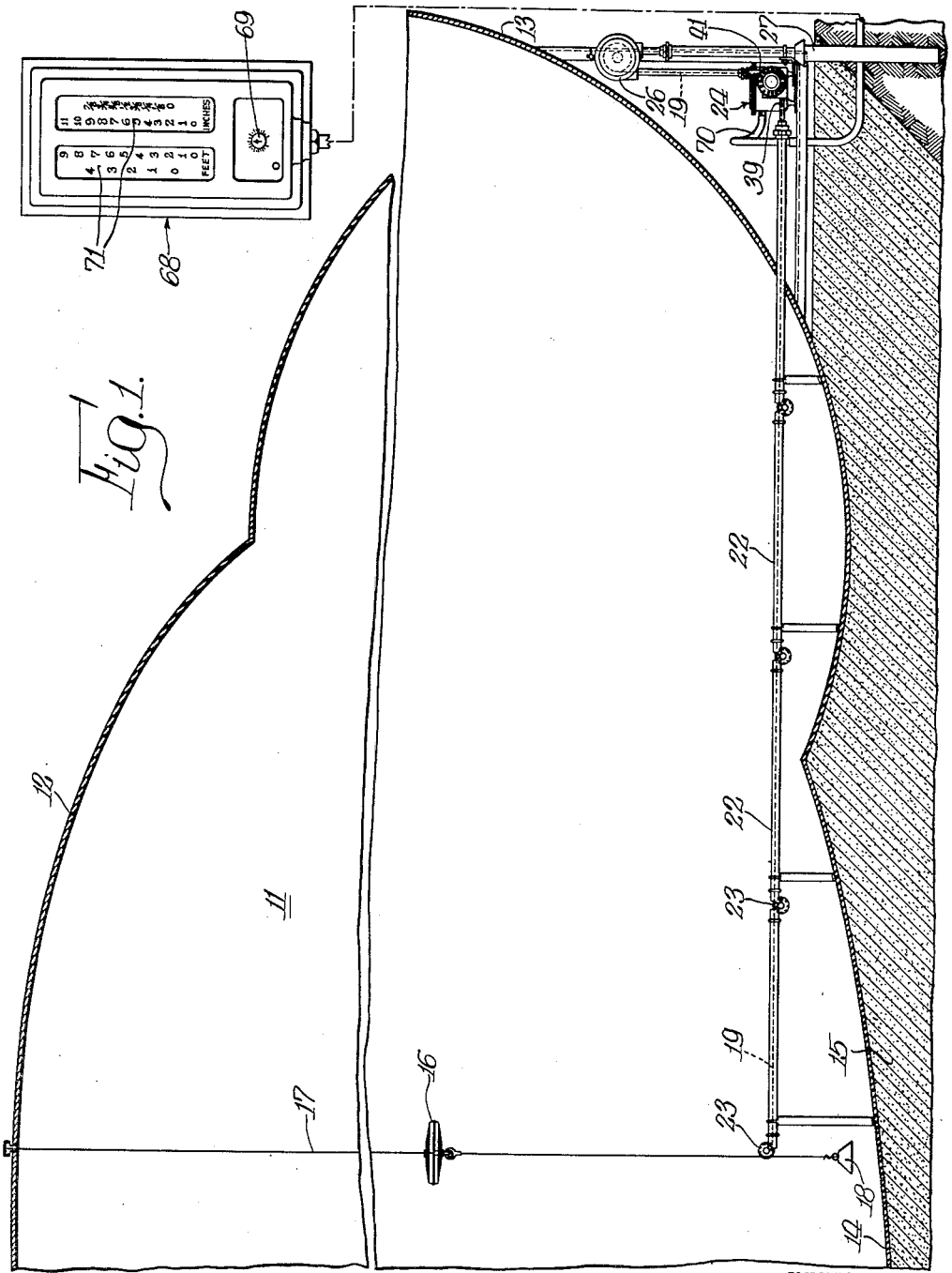
INVENTOR.
Eugene T. Sliwinski,
BY
Bair & Freeman
Atty's.

Dec. 4, 1951  E. T. SLIWINSKI  2,577,282
DRIVE MECHANISM
Filed July 29, 1946  3 Sheets-Sheet 2
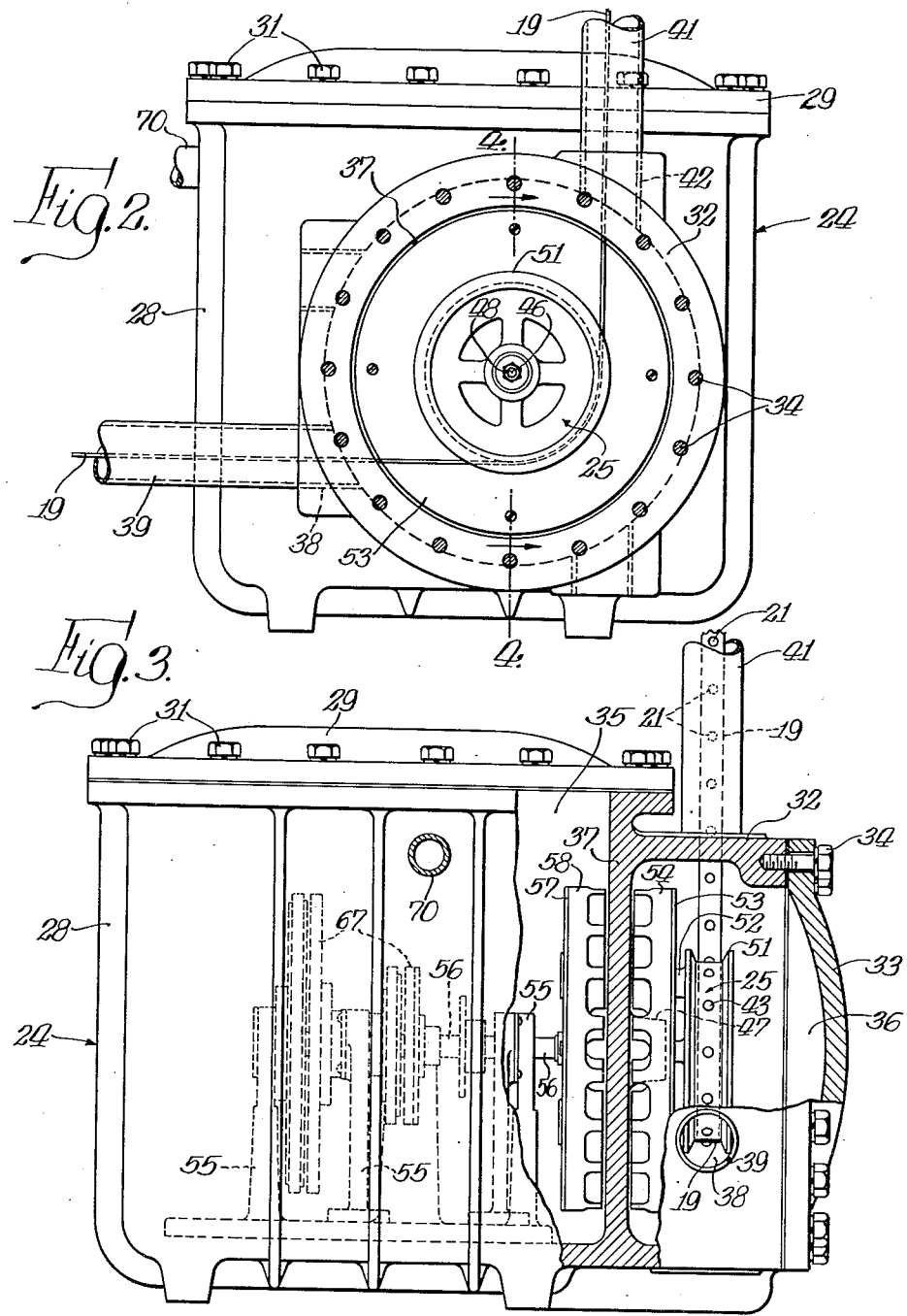
INVENTOR.
Eugene T. Sliwinski,
BY
Bair & Freeman
Attys.

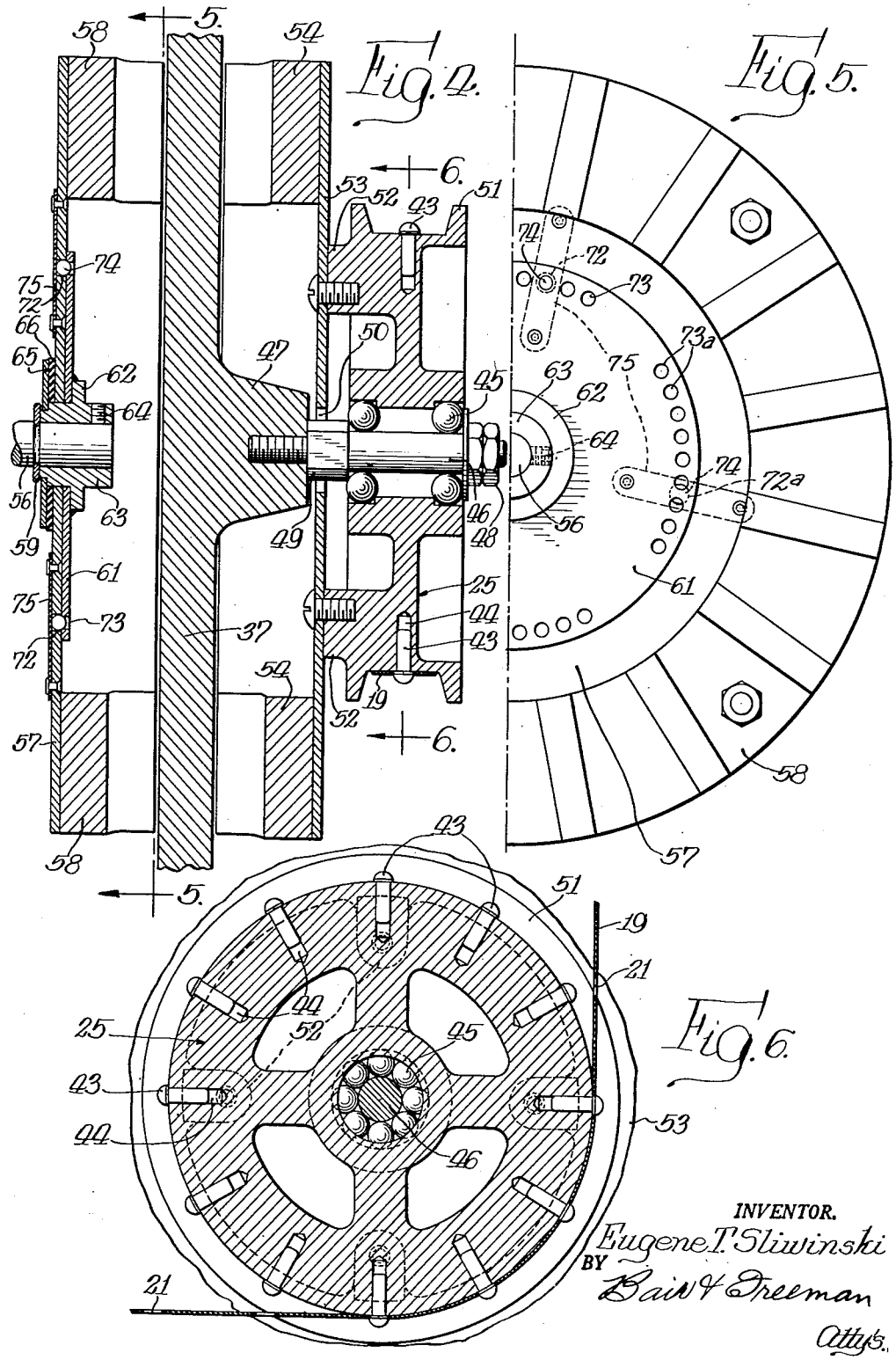

Patented Dec. 4, 1951

2,577,282

UNITED STATES PATENT OFFICE 2,577,282

DRIVE MECHANISM

Eugene T. Sliwinski, Chicago, Ill., assignor to Telematic Corporation, Chicago, Ill., a corporation of Delaware Application July 29, 1946, Serial No. 686,871

7 Claims. (Cl. 172—284)

This invention relates to a drive mechanism and particularly to a drive mechanism for a storage tank gauge which is adjustable for liquids of different specific gravity.

Heretofore various types of storage tank gauge mechanisms have been utilized, but all had definite disadvantages which are overcome by the present construction. The problems in gauging apparatus arise mainly in connection with storage tanks for storing volatile liquids, such as refined oils or hydrocarbons, which are generally stored in sphere or spheroid or other types of tanks. The present invention overcomes these problems, but is not necessarily limited to gauging apparatus for volatile liquids.

One of the problems in liquid level gauging apparatus is the difficulty of adjusting the apparatus for gauging liquids of varying specific gravities, such as kerosene and gasoline, for example. The liquid level is usually followed by a float, and differences in specific gravity cause the float to sink to different depths in the liquid, thereby changing the reading on the indicating gauge, which is read down to one-eighth (1/8) of an inch. The difference in specific gravity between different liquids may easily cause a one-eighth (1/8) of an inch variation in the level of the float, or more, and when it is realized that a variation of one-eighth (1/8) of an inch in a large tank is the equivalent of perhaps 50 barrels of liquid stored, it is readily appreciated that extreme accuracy is necessary for true readings.

Furthermore, the float of the gauging apparatus is generally connected to the portion of the apparatus outside the tank by a relatively long stainless steel tape or wire, and radical changes in temperature may cause a variation of one-eighth (1/8) of an inch or more in the tape length due to expansion or contraction of the metal. The apparatus must, therefore, be adjusted for differences in temperature when such differences are relatively great, such as those encountered in many refineries and chemical plants.

Adjustable gauging devices have also been provided by changing the position of the mechanism operated by the float, but heretofore this type of adjustment has entailed opening a sealed container which possibly had highly volatile and explosive gases therein, which was, obviously, very dangerous.

It is, therefore, an object of the invention to provide a unique adjustment for liquid level gauging apparatus which is capable of relatively fine changes.

It is also an object of the invention to provide an adjustment for the individual mechanisms at the storage tank in liquid level gauging systems wherein a single central indicator is utilized for ascertaining the level of liquid in a remote tank or tanks.

It is a further object of the invention to provide an adjustment for liquid level gauging apparatus which is disposed in a location wherein it is impossible for noxious or explosive materials stored in the tank to be present.

The present invention also is particularly applicable to central gauging apparatus, wherein the tank level is electrically indicated by a set of suitable electric contacts at each tank which are operated by the float, and then transmit the reading electrically to a central point through suitable electrical connections. However, the invention is not limited to such installations, except as specifically set forth in the appended claims.

Heretofore, it has been the practice to drive or move a drive wheel by movement of the tape or wire flexible connector to the float, which drive wheel in turn rotated contacts in a sealed container through a sealed shaft. Obviously, no explosive gas should be allowed to enter the container for the contacts, because of the danger of a spark causing an explosion and also because many such gases cause corrosion or pitting of some of the metal parts. Even though such containers were usually filled with oil, there was always the danger that some gas might seep into the container, for example, through the seal for the shaft. Furthermore, such seals present a constant servicing problem and added friction which tend to render the gauging apparatus inaccurate.

It is, therefore, another object of the invention to provide an entirely sealed chamber for the electrical portions of such gauging apparatus, through which no rotating shafts extend.

It is still another object of the invention to provide a novel magnetic drive for transmitting the motion of a driven element to mechanism within a sealed casing, and particularly of a wheel of liquid level gauging apparatus to rotating electrical contact carrying elements within a sealed casing.

It is a further object of the invention to provide a magnetic drive of the character described utilizing certain similar parts.

It is still another object of the invention to provide a novel magnetic drive utilizing permanent magnets.

With these and other objects in view, my invention consists in the construction, arrangement and combination of the various parts of my device whereby the objects contemplated are attained as hereinafter more fully set forth, pointed out in my claims, and illustrated in the accompanying drawings, in which:

Figure 1 is a partial sectional view of a storage tank to which the invention may be applied, and also illustrates a gauging device and a liquid level indicator, which indicator is usually located at a remote point from the tank or tanks.

Figure 2 is a partial sectional view of the gauging device containing the novel drive;

Figure 3 is a plan view of the gauging device shown in Figure 2 with parts thereof broken away for clarity;

Figure 4 is a partial sectional view of the gauging device taken on line 4—4 of Figure 2;

Figure 5 is a partial sectional view of the gauging device taken on line 5—5 of Figure 4; and Figure 6 is a partial sectional view of the gauging device taken on line 6—6 of Figure 5.

Referring specifically to the drawings for a detailed description of the invention, numeral 11 designates generally a spheroid tank having a top wall 12, a side wall 13 and a bottom wall 14 which rests on a foundation 15. A float 16 is disposed centrally of the tank 11 and is suspended by guide means 17 suspended from the top 12 of the tank 11 and held taut by a weight 18. The float is connected to a flexible connector in the form of a tape 19 having a plurality of spaced apertures 21 therein, for a purpose hereinafter described.

The float construction is preferably of the type shown and claimed in my copending application, Serial No. 674,914 filed June 6, 1946, for Float which application has matured into Patent No. 2,549,859.

The tape 19 is led through a plurality of guide pipes 22 and over a plurality of rollers 23 to a gauging device disposed outside the tank 11 near the bottom of the side wall 14, the gauging device being generally designated by the numeral 24. The tape 19 passes over a rotating drive wheel 25 of the gauging device 24, then over a pulley 26 and is attached to a counter weight (not shown) in a well 27.

The guide pipes 22 and rollers 23 are shown and claimed in my copending application, Serial No. 674,915, filed June 6, 1946, for Flexible Connector Guide, and further description is, therefore, unnecessary.

The gauging device 24 comprises a cup-shaped casing 28 provided with a cover 29 held in gas tight sealing engagement with the casing 28 by bolts 31. A gasket (not shown) is disposed between the casing 28 and cover 29. The casing 28 is also provided with a cylindrical extension 32 disposed on one side thereof and provided also with a gas tight cover 33 held thereon by means of bolts 34, with a gasket (not shown) between the cylindrical extension 32 and cover 33. As best shown in Figure 3, the casing, therefore, forms two chambers 35 and 36 with a solid gas tight partition 37 therebetween.

As shown in Figures 2 and 3, the chamber 36 is provided with an opening 38 in the side thereof, into which a pipe section 39 extends and is preferably welded in place. Another pipe section 41 is preferably welded to an opening 42 at the top of chamber 36. The tape 19 is led through pipe 39 and opening 38, over the drive wheel 25 and then out of opening 42 and pipe 41 to the pulley 26 and counterweight. The drive wheel is provided with a plurality of circumferentially spaced studs 43, as best shown in Figure 6, which are secured in recesses 44 in the drive wheel. The studs 43 are engaged by the apertures 21 in the tape 19 to provide a positive drive in which no slipping of the tape relative to the wheel drive 25 may occur.

The drive wheel 25 is journalled by ball bearings 45 on a stub shaft 46, which is screwed into a boss 47 disposed centrally of the partition 37 and extending into the chamber 36. A lock nut means 48 holds the drive wheel 25 in place against a collar 49 on shaft 46.

The drive wheel 25 is provided with flanges 51 about its periphery to guide tape 19, and is also provided with bosses 52 on one side thereof, to which a magnet disc 53 is secured by screws 54.

The disc 53 is spaced from the collar 49, as shown at 50, in Figure 4, so that the wheel 25 and disc 53 are free to rotate on stub shaft 46.

A plurality of permanent magnets 54 having alternately opposite polarity are secured to the inner face of the disc 53. The partition 37 is a non-magnetic material, such as cast aluminum, and the entire casing is preferably formed of the same material. It is obvious that the chamber 36 is entirely sealed and has no connection through which gas or liquid may flow with the chamber 35.

A plurality of bearing supports 55 are formed integrally with a base fixedly mounted in the bottom of casing 28 and support a shaft 56. The shaft 56 has a magnet disc 57 secured thereto adjacent partition 37 and a plurality of alternately opposite polarity permanent magnets 58 are secured to the inner face of disc 57 in alignment with the permanent magnets 54. The disc 57 is preferably similar in shape to disc 53 and is secured to shaft 56 by a C-shaped spring snap member 59, which forces the disc 57 against an adjusting disc 61 welded to a shoulder 62 on a collar 63 surrounding the shaft 56 and secured thereto by a screw 64. A pair of washers 65 and 66, the innermost of which is formed of resilient material, are disposed between the snap member 59 and the disc 57.

Two pairs of electrical contact carrying members 67 are secured to the shaft 56 in chamber 35 and are connected by suitable electrical connections (not shown) to an indicating device 68 shown in Figure 1. An electric conduit pipe 70 is provided for the chamber 35 and carries the necessary electrical connections into and out of the contact chamber to the indicator 68.

When the float 16 rises or falls, the tape 19 is moved and the drive wheel 25 is rotated, thus rotating the magnets 54. Magnets 54, in turn, rotate magnets 58 and shaft 56, through the non-magnetic partition 37, thereby rotating the contact carrying members 67. The two sets of magnets 54 and 58 stay "in gear" because the north and south poles of respective magnets always attract and do not move relative to each other.

The indicator 68 at a central location includes a knob 69 which may be turned to different positions to select the tank on which a reading is desired, and the level of the liquid in that tank is indicated in feet, inches, and eighths of an inch on indicator panels 71, depending on the position of float 16 in that particular tank, and, therefore, the position of the contact carrying members 67. The contact carrying member may, therefore, be termed liquid level translating means.

The telemetric electrical system and indicating device form no part per se of the present invention and further description is, therefore, dispensed with. An illustration of a suitable electrical system for use with the present invention may be found in the patent to Charles J. Doyle, No. 2,216,069, issued September 24, 1940.

In order to provide for adjustment of the gauging device for liquids of various specific gravities and, incidentally, for wide variations in temperature, the magnet carrying disc 57 is provided with four circular holes, one set of diametrically opposed holes being shown at 72 and the other set at 72a. The adjusting disc 61, which is welded to the collar 63 secured to shaft 56 and rotatable therewith, is also provided with a plurality of circular holes 73 and 73a. It is to be noted that the holes 73 are in two diametrically opposite sets, as are holes 73a. The two diametrically opposite sets of holes 73 are disposed at a little less or a little more than a right angle to the corresponding other diametrically opposite sets of holes 73a, so that two diametrically opposite holes 72 may register with holes 73, or two opposite holes 72a may register with holes 73a.

Four balls 74, each of which is diametrically opposite one other ball, are retained on one side in holes 72 and and 72a in magnet disc 57 by riveted spring clips 75. The adjusting plate 61 retains the balls 74 in position on the other side, since the holes 72 and 72a are larger than the balls 74, while holes 73 and 73a are smaller than the balls 74.

Assuming that the holes and balls are in the position shown in Figure 5, and it is desired to vary the reading relative to the float 16 by one-eighth of an inch, the cover 29 is removed and the magnet disc 57 is rotated relative to adjusting disc 61 by preventing the shaft 56 from turning, and rotating disc 57, the spring clips 75 affording slight axial movement of balls 74 so that the discs may slide relative to each other. The balls 74 are only moved a sufficient distance, however, to move ball 74 shown as not registering with holes 73a in Figure 5 into registry with the next hole 73a, and moving ball 74 shown as in registry with holes 73 out of registry therewith. The magnets 58 then move magnets 54 a sufficient distance to adjust the float reading one-eighth of an inch. If a one-quarter inch adjustment is desired, then the ball 74 shown in registry with holes 73 in Figure 5 is moved into registry with the next hole 73. It will be seen, therefore, that any one-eighth or one-quarter inch increments of adjustment may be obtained up to the number of holes available in the adjustment disc.

From the foregoing, it will be apparent that I have provided extremely safe liquid level gauging apparatus which is particularly applicable to electrically operated remote indicators, although not limited thereto. Furthermore, I have provided a unique drive and adjusting means for such apparatus.

Some changes may be made in the construction and arrangement of the parts of my drive mechanism without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. A magnetic coupling for liquid level indicating apparatus comprising a sealed casing having at least one wall formed of non-magnetic material, a driving member including a shaft disposed on one side of said wall, a rotatably driven member within said casing including a shaft, magnetic means associated with each shaft disposed adjacent to but spaced from said non-magnetic wall, a first disc secured to one of the shafts, a second disc rotatably mounted on said shaft, said magnetic means associated with said shaft being mounted on said second disc, means for securing said second disc to said first disc, means for circumferentially shifting said first disc with respect to said second disc, whereby circumferential adjustments between the two shafts are provided.

2. A magnetic coupling for liquid level indicating apparatus comprising a sealed casing having at least one wall formed of non-magnetic material, a driving member including a shaft disposed on one side of said wall, a rotatably driven member within said casing including a shaft, magnetic means associated with each shaft disposed adjacent to but spaced from said non-magnetic wall, a first disc secured to one of the shafts, a second disc rotatably mounted on said shaft, said magnetic means associated with said shaft being mounted on said second disc, means for circumferentially shifting said first disc with respect to said second disc, whereby circumferential adjustments between the two shafts are provided, said means for shifting the first disc relative to the second disc comprising two sets of steps in one of the discs disposed diametrically opposite each other, and means associated with the other disc adapted to cooperate with one step of each set of steps to fix the discs relative to each other.

3. A magnetic coupling for liquid level indicating apparatus comprising a sealed casing having at least one wall formed of non-magnetic material, a driving member including a shaft disposed on one side of said wall, a rotatably driven member within said casing including a shaft, magnetic means associated with each shaft disposed adjacent to but spaced from said non-magnetic wall, a first disc secured to one of the shafts, a second disc rotatably mounted on said shaft, said magnetic means associated with said shaft being mounted on said second disc, means for circumferentially shifting said first disc with respect to said second disc, whereby circumferential adjustments between the two shafts are provided, said means for shifting the first disc relative to the second disc comprising a first pair of sets of steps in one of the discs disposed diametrically opposite each other, a first positioning means associated with the other disc adapted to cooperate with one step of each first pair of sets of steps to fix the discs relative to each other, said steps in the first pair of sets of steps being spaced at equal increments, which increments are predetermined to give a unit adjustment.

4. A device as described in claim 3 including a second pair of sets of steps in one disc, said second pair of sets of steps being disposed diametrically with respect to each other and displaced from said first pair of sets of steps slightly more or less than ninety degrees, and a second positioning means in the other disc adapted to cooperate with one step of each second pair of sets of steps to fix the discs relative to each other, the steps of the second pair of sets of steps being spaced at the same increments as the steps of the first pair of sets of steps, said second pair of sets of steps being so positioned that when the first positioning means are located half way between successive steps in the first pair of sets of steps, the second positioning means are in register with a pair of opposite steps in said second pair of sets of steps, whereby incremental adjustments between the discs of one-half unit are provided.

5. A magnetic coupling for liquid level indicating apparatus comprising a sealed casing having at least one wall formed of non-magnetic material, a driving member including a first shaft disposed on one side of said wall, a rotatably driven member within said casing including a second shaft, first magnetic means secured to the first shaft disposed adjacent to but spaced from said non-magnetic wall, cooperating second magnetic means disposed within the sealed casing also adjacent to and spaced from said non-magnetic wall, a first disc secured to the second shaft, a second disc adjacent said first disc and rotatably mounted on said second shaft, said second magnetic means being mounted on said second disc, means for circumferentially adjusting said first disc with respect to said second disc, whereby circumferential adjustments between the first and second shaft are provided, said means for shifting the first disc relative to the second disc comprising two sets of holes in one of the discs disposed diametrically opposite each other, a pair of balls disposed diametrically opposite each other in apertures in the adjacent disc, said balls being of greater dimension than the size of the holes of the sets of holes in the one disc, and resilient means for yieldably biasing the balls toward the one disc where the balls register with the holes therein to fix the discs relative to each other.

6. A magnetic coupling for liquid level indicating apparatus comprising a sealed casing having at least one wall formed of non-magnetic material, a driving member including a first shaft disposed on one side of said wall, a rotatably driven member within said casing including a second shaft, first magnetic means secured to the first shaft disposed adjacent to but spaced from said non-magnetic wall, cooperating second magnetic means disposed within the sealed casing also adjacent to and spaced from said non-magnetic wall, a first disc secured to the second shaft, a second disc adjacent said first disc and rotatably mounted on said second shaft, said second magnetic means being mounted on said second disc, means for circumferentially adjusting said first disc with respect to said second disc, whereby circumferential adjustments between the first and second shaft are provided, said means for shifting the first disc relative to the second disc comprising two sets of holes in one of the discs disposed diametrically opposite each other, a pair of balls disposed diametrically opposite each other in apertures in the adjacent disc, said balls being of greater dimension than the size of the holes of the sets of holes in the one disc, and resilient means for yieldably biasing the balls toward the one disc where the balls register with the holes therein to fix the discs relative to each other, said holes in the first pair of sets of holes being spaced at equal increments, which increments are predetermined to give a unit adjustment.

7. A device as described in claim 6 including a second pair of sets of holes in one disc, said second pair of sets of holes being disposed diametrically with respect to each other and displaced from said first pair of sets of holes slightly more or less than ninety degrees, a second pair of balls disposed diametrically opposite each other in apertures in the adjacent disc, resilient means for yieldably biasing the second pair of balls towards the other disc where the balls register with the second pair of sets of holes to fix the discs relative to each other, the holes of said second pair of sets of holes being spaced at the same increment as the first pair of holes, said second set of pairs of holes being so positioned on said one disc that when the first pair of balls are located half way between successive holes in the first pair of sets of holes, the second pair of balls are in register with a pair of opposite holes of said second pair of sets of holes, whereby incremental adjustments between the discs of one-half unit are provided.

EUGENE T. SLIWINSKI.

REFERENCES CITED

The following references are of record in the file of this patent:

UNITED STATES PATENTS

| Number | Name | Date |
|---|---|---|
| 1,982,970 | Star | Dec. 4, 1934 |
| 2,056,177 | Erbguth | Oct. 6, 1936 |
| 2,182,469 | Davis | Dec. 5, 1939 |
| 2,216,035 | Lang | Sept. 24, 1940 |
| 2,216,069 | Doyle | Sept. 24, 1940 |
| 2,269,539 | Long | Jan. 13, 1942 |
| 2,310,357 | Edelman | Feb. 9, 1943 |
| 2,381,211 | Crittenden | Aug. 7, 1945 |